US012521025B2

(12) United States Patent
Kon et al.

(10) Patent No.: US 12,521,025 B2
(45) Date of Patent: Jan. 13, 2026

(54) BIOLOGICAL CONDITION DIAGNOSIS SYSTEM

(71) Applicant: Konica Minolta, Inc., Tokyo (JP)

(72) Inventors: Shusaku Kon, Hino (JP); Ryo Nakabayashi, Hachioji (JP); Kosuke Ando, Akishima (JP)

(73) Assignee: KONICA MINOLTA, INC., Tokyo (JP)

( * ) Notice: Subject to any disclaimer, the term of this patent is extended or adjusted under 35 U.S.C. 154(b) by 419 days.

(21) Appl. No.: 18/247,310

(22) PCT Filed: Sep. 21, 2021

(86) PCT No.: PCT/JP2021/034608
§ 371 (c)(1),
(2) Date: Mar. 30, 2023

(87) PCT Pub. No.: WO2022/071028
PCT Pub. Date: Apr. 7, 2022

(65) Prior Publication Data
US 2024/0000324 A1    Jan. 4, 2024

(30) Foreign Application Priority Data
Oct. 2, 2020   (JP) ................. 2020-167378

(51) Int. Cl.
*A61B 5/021*   (2006.01)
*A61B 5/00*    (2006.01)
(Continued)

(52) U.S. Cl.
CPC ........ *A61B 5/02116* (2013.01); *A61B 5/0205* (2013.01); *A61B 5/02125* (2013.01);
(Continued)

(58) Field of Classification Search
CPC .............. A61B 5/02116; A61B 5/0205; A61B 5/02125; A61B 5/14552; A61B 5/7203;
(Continued)

(56) References Cited

U.S. PATENT DOCUMENTS 3,896,792 A * 7/1975 Vail ...................... A61B 5/0803
                                                           73/31.04
9,962,090 B2 * 5/2018 DiMaio ................... G16Z 99/00
(Continued)

FOREIGN PATENT DOCUMENTS

JP    H05-024006 U    3/1993
JP    H05-049625 A    3/1993
(Continued)

OTHER PUBLICATIONS

International Preliminary Report on Patentability dated Mar. 28, 2023, for the corresponding patent application No. PCT/JP2021/034608, with English translation.
(Continued)

*Primary Examiner* — Jeffrey G. Hoekstra
(74) *Attorney, Agent, or Firm* — LUCAS & MERCANTI, LLP

(57) ABSTRACT

A biological condition diagnosis system includes, at least: an obtainer, a receiver, a preprocessor, a processor, and a diagnoser, for biological data. The obtainer obtains the biological data by a reflective photoelectric plethysmography sensor. The preprocessor optimally preprocesses the obtained biological data. The processor extracts a feature point from the preprocessed data. The diagnoser diagnoses a biological condition using machine learning, based on the extracted biological data.

13 Claims, 7 Drawing Sheets

(51) Int. Cl.
*A61B 5/0205* (2006.01)
*A61B 5/1455* (2006.01)

(52) U.S. Cl.
CPC ........ *A61B 5/14552* (2013.01); *A61B 5/7203* (2013.01); *A61B 5/7267* (2013.01); *A61B 5/0015* (2013.01); *A61B 5/6801* (2013.01); *A61B 5/742* (2013.01); *A61B 2560/02* (2013.01); *A61B 2560/04* (2013.01); *A61B 2562/0238* (2013.01)

(58) Field of Classification Search
CPC ................ A61B 5/7267; A61B 5/0015; A61B 5/6801; A61B 5/742; A61B 2560/02; A61B 2560/04; A61B 2562/0238; A61B 2562/0233; A61B 2562/164; A61B 5/02416; A61B 5/14551; A61B 5/7264; G16H 50/20
See application file for complete search history.

(56) References Cited

U.S. PATENT DOCUMENTS

| | | | | |
|---|---|---|---|---|
| 10,517,484 | B2 * | 12/2019 | Islam | .................... G01J 3/0218 |
| 10,667,757 | B2 * | 6/2020 | Park | .................... A61B 5/7239 |
| 10,750,992 | B2 * | 8/2020 | Fan | .................... A61B 5/026 |
| 10,928,374 | B2 * | 2/2021 | Islam | ................ G01N 21/3504 |
| 11,304,604 | B2 * | 4/2022 | DiMaio | ................ A61B 5/0077 |
| 12,059,273 | B2 * | 8/2024 | Kwon | ................ A61B 5/02116 |
| 2016/0270668 | A1 * | 9/2016 | Gil | .................... A61B 5/14551 |
| 2017/0095211 | A1 * | 4/2017 | Wang | .................... A61B 5/721 |
| 2017/0209052 | A1 | 7/2017 | Nakamura | |
| 2018/0160943 | A1 | 6/2018 | Fyfe et al. | |
| 2019/0110758 | A1 | 4/2019 | Kang et al. | |
| 2020/0037960 | A1 | 2/2020 | Hashimoto et al. | |

FOREIGN PATENT DOCUMENTS

| | | | | |
|---|---|---|---|---|
| JP | 5218139 | B2 | 6/2013 | |
| JP | 2016-032631 | A | 3/2016 | |
| JP | 2018-047219 | A | 3/2018 | |
| JP | 2018130541 | A | 8/2018 | |
| JP | 2018202130 | A | 12/2018 | |
| JP | 2019097828 | A | 6/2019 | |
| JP | 2020-018430 | A | 2/2020 | |
| JP | 2020-044189 | A | 3/2020 | |
| KR | 10-2017-0048970 | A | 5/2017 | |
| KR | 10-2020-0097556 | A | 8/2020 | |
| KR | 10-2020-0110116 | A | 9/2020 | |
| WO | WO-2011106792 | A2 * | 9/2011 | ............. G16Z 99/00 |
| WO | 2015/049963 | A1 | 4/2015 | |
| WO | WO-2022071028 | A1 * | 4/2022 | ......... A61B 5/14551 |

OTHER PUBLICATIONS

Office Action, dated Jun. 18, 2025, issued for the corresponding Korean Patent Application No. 10-2023-7011133.

Office Action, dated Jun. 23, 2025, issued for the corresponding Chinese Patent Application No. 202180066213.2.

Notice of Reasons for Refusal, dated Oct. 1, 2024, issued for the corresponding Japanese Application No. 2022-553852, 18 pages, with English translation.

Office Action issued for the related Japanese patent application No. 2022-553852, mailed on Jan. 14, 2025, with its machine English translation, 12 pages.

PCT, International Search Report for the corresponding patent application No. PCT/JP2021/034608, mailed Dec. 7, 2021, with English translation (4 pages).

* cited by examiner

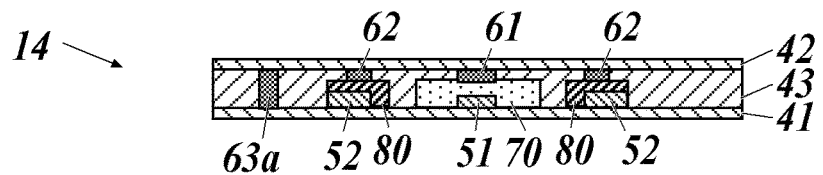
FIG.3C
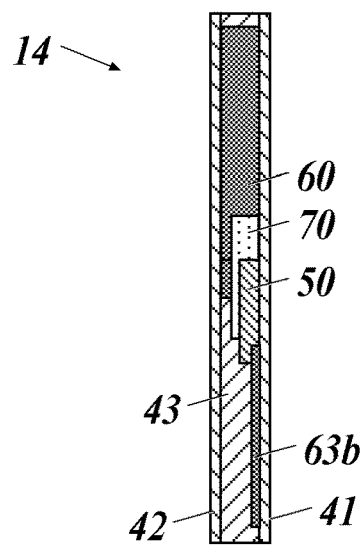
FIG.3D
FIG.4A
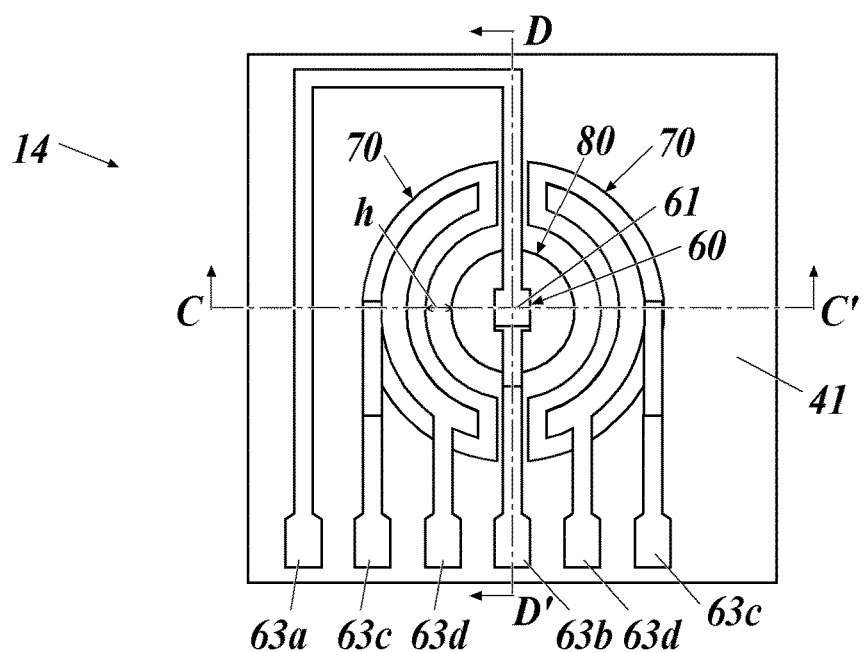

BIOLOGICAL CONDITION DIAGNOSIS SYSTEM

CROSS REFERENCE TO RELATED APPLICATION

This Application is a 371 of PCT/JP2021/034608 filed on Sep. 21, 2021, which, in turn, claimed the priority of Japanese Patent Application No. 2020-167378 filed on Oct. 2, 2020, all of which are incorporated herein by reference.

TECHNICAL FIELD

The present invention relates to a biological condition diagnosis system, and in particular to a biological condition diagnosis system that diagnoses based on at least biological data obtained using a sensor, such as a reflective photoelectric plethysmography sensor.

DESCRIPTION OF THE RELATED ART

Increase in medical care expenditure due to advancement in aging is expected to cause a serious problem in the near future, and medical digital transformation (DX) has been activated. Against this backdrop, sensor technologies have been advanced, thus enabling non-invasive and simple obtainment of vital data. That is, a lot of vital data items have been obtainable that include cardiac electricity, myoelectricity, pneumo-electricity, brain waves, blood oxygen level utilizing light absorption of blood, and pulse waves, through obtainment of electric signals of vital reactions (for example, see Patent Literatures 1 to 4).

Furthermore, the accuracies and user-friendliness of these devices have been improved. Accordingly, medical level data have been obtainable even by those who are not specialists.

In the current situation, in hospitals, data obtained by specialists, such as nurses, is examined by doctors, and diagnosis is made. Combined use of sensing technologies and AI technologies have been preparing infrastructure that allows automatic diagnosis. Simple obtainment of accurate vital data can collect a temporal and spatial (every site in the body) range of many data items. In consideration of slight signs having been ignored, disease prediction and improvement in diagnostic accuracy can be expected.

Among them, pulse waves contain much information on the circulatory system. By reading the waveform and temporal behavior of pulses, diseases can be diagnosed.

However, pulse waves are obtained through attachment to a fingertip, which causes cumbersomeness. Accordingly, continuous attachment in daily life is difficult. Typically, a transmission type is used, and measurement can be performed only at a distal end that allows light transmission. Blood vessels are distributed in the entire body. Their behaviors vary according to sites to be measured.

For example, in case a thrombus resides in a leg, the behavior is unlikely to appear in pulse waves measured at a hand. Accordingly, there are behaviors that cannot be visualized only by measurement on a fingertip.

Furthermore, by simultaneously obtaining waveforms obtained by a cardiac electrogram and pulse waves, predictors of cerebral infarction and cardiac infarction caused by atrial fibrillation can be captured. However, in a case of using a fingertip type, devices are required to be attached for the sake of cardiac electricity and pulse waves, thus increasing cumbersomeness (for example, see Patent Literature 1).

Pasting type sensors are used not only for cardiac electricity, but also for pneumo-electricity, myoelectricity, and brain waves. Accordingly, a case of obtaining pulse waves by a transmission type causes a problem of difficulty in device integration.

On the other hand, photoelectric plethysmography is a technology of vital sensing widely used for pulse oximeters. This technology calculates the blood oxygen level by utilizing the difference between the absorbances of oxidized hemoglobin and unoxidized hemoglobin through use of red and infrared light, which have high transmittivity through a biological body.

Typically, a transmission type is used. However, transmissive sites in a biological body are limited to distal ends, such as fingertips and ears. It is not preferable also in view of wearable capability. Reflective photoelectric plethysmography advantageous in wearable capability is commercially available for smartwatches and the like in terms of green light. However, there are a small number of product examples that use red light or infrared light.

This is because the sensitivity of pulse wave detection is low. Unlike to a transmission type, a reflective type leads to repetitive scattering returning to a body surface. Accordingly, the light intensity is significantly low, which is likely to cause noise. It is thus difficult to obtain a clear signal.

There are more blood vessels at the depth than distal ends. Accordingly, light is required to enter the depth. In this case, a sensor and a light source are required to have a distance between them, which further attenuates the light intensity. While measurement of the blood oxygen level requires red light and infrared light, measurement only of pulse waves can be achieved only with green light.

However, green light is largely absorbed by a biological body, and is incident only to a surface. Accordingly, only variation in capillary blood vessels can be captured. It is thus unsuitable to accurately drawing the form of pulse waves.

On the other hand, use of green light is advantageous in that the S/N ratio of heartbeats itself is less affected by external light because the absorbance is high and the sensitivity is high. Furthermore, since capillary blood vessels are relatively uniformly distributed, the robustness against the position is high.

In a case where the form of pulse waves is important, red light and infrared light are sometimes more suitable than green light. In recent years, it has been reported that capturing the behavior of atrial fibrillation enables cerebral infarction, cardiac infarction and the like to be prevented, and continuous monitoring of a cardiac electrogram and pulse waves has been discussed (for example, see Patent Literature 1).

If continuous monitoring can achieve prevention, this leads to reduction in medical care expenditure. Adoption of a reflective type can enlarge the variety of measurement sites, and achieve what has less wearing discomfort, thus leading to continuous monitoring and improvement in measurement site flexibility.

Consequently, a biological condition diagnosis system is demanded that includes a sensor, such as a reflective photoelectric plethysmography sensor, improves the flexibility of the measurement site of a subject by a sensor, sensor wearing feeling, and measurement accuracy, and is continuously applicable to monitoring.

CITATION LIST

Patent Literature

[Patent Literature 1] JP 5218139B
[Patent Literature 2] JP 2018-130541A

[Patent Literature 3] JP 2018-202130A
[Patent Literature 4] JP 2019-97828A

SUMMARY OF THE INVENTION

Technical Problem

The present invention has been made in view of the problems and situations described above, and has an object to provide a biological condition diagnosis system that includes a reflective photoelectric plethysmography sensor, improves the flexibility of the measurement site of a subject by a sensor, sensor wearing feeling, and measurement accuracy, and is continuously applicable to monitoring.

Solution to Problem

To solve the problem described above, the present inventors have discussed the cause of the problem described above and the like, have resultantly found that by using a reflective photoelectric plethysmography sensor and by diagnosing a biological condition using machine learning, the flexibility of the measurement site of a subject by the sensor, sensor wearing feeling, and measurement accuracy are improved, and applicability to continuous monitoring is achieved, and have thus achieved the present invention.

That is, the object according to the present invention is achieved by the following means.

1. A biological condition diagnosis system, including, at least: an obtainer, a receiver, a preprocessor, a processor, and a diagnoser, for biological data,
wherein the obtainer obtains the biological data by a reflective photoelectric plethysmography sensor,
the preprocessor optimally preprocesses the obtained biological data,
the processor extracts a feature point from the preprocessed data, and
the diagnoser diagnoses a biological condition using machine learning, based on the extracted biological data.
2. The biological condition diagnosis system according to the first item, wherein a light emitting element of the reflective photoelectric plethysmography sensor is planar, and is used as a planar light source for light with which biological tissue is illuminated.
3. The biological condition diagnosis system according to the first or second item, wherein a light emitting element of the reflective photoelectric plethysmography sensor is an organic EL element.
4. The biological condition diagnosis system according to any one of the first to third items, wherein a light receiving element of the reflective photoelectric plethysmography sensor is an organic photodiode.
5. The biological condition diagnosis system according to any one of the first to fourth items, wherein the obtainer continuously measures and obtains the biological data.
6. The biological condition diagnosis system according to any one of the first to fifth items, wherein the obtainer simultaneously measures and obtains two or more types of the biological data.
7. The biological condition diagnosis system according to any one of the first to sixth items, wherein the obtainer simultaneously measures and obtains the biological data on biological sites at two or more positions.
8. The biological condition diagnosis system according to any one of the first to seventh items, further including
a combiner that combines the obtained biological data and generates an integrated data item.
9. The biological condition diagnosis system according to any one of the first to eight items, wherein the diagnoser uses a learning model obtained by machine learning where the biological data in accordance with an attribute is adopted as an explanatory variable, and the corresponding biological condition in accordance with the attribute is adopted as an objective variable.
10. The biological condition diagnosis system according to any one of the first to ninth items, wherein the diagnoser uses a learning model using deep learning, based on the obtained biological data.
11. The biological condition diagnosis system according to any one of the first to tenth items,
wherein the reflective photoelectric plethysmography sensor is a reflective photoelectric plethysmography sensor that includes the light emitting element and the light receiving element that are planar,
the light emitting element and the light receiving element do not face with each other in a vertical direction, and
provided that a shortest distance between the light emitting element and the light receiving element is h (mm), a thickness of skin (epidermis+dermis) of a human body is t (mm), and the thickness is within a range from 0.1 to 4 mm,
the shortest distance h (mm) between at least one pair of the light emitting element and the light receiving element satisfies the following Expression (1), $$(t \times 0.7)^2 \leq h \leq (t \times 1.3)^2. \qquad \text{Expression (1)}$$

12. The biological condition diagnosis system according to the eleventh item, wherein the shortest distance between the light emitting element and the light receiving element is within a range from 2 to 25 mm.
13. The biological condition diagnosis system according to the eleventh or twelfth item, further comprising a plurality of the light emitting elements, wherein each of the light emitting elements is disposed on a substantially concentric circle centered on a center point of the light receiving element.

Advantageous Effects of Invention

The aforementioned solution of the present invention can provide a biological condition diagnosis system that includes a reflective photoelectric plethysmography sensor, improves the flexibility of the measurement site of a subject by a sensor, sensor wearing feeling, and measurement accuracy, and is continuously applicable to monitoring.

The biological condition diagnosis system of the present invention uses at least the reflective photoelectric plethysmography sensor. Accordingly, the system can measure even a site of a subject through which no light passes. Thus, the pulse wave distribution over the entire body can be obtained. That is, the variation in measurement site can be enlarged, which can lead to continuous monitoring and improvement in measurement site flexibility.

Furthermore, the system can easily be integrated with another vital sensor, and cumbersomeness during continuous measurement can be eliminated. Here, "continuous measurement" indicates continuous measurement for a certain extent of time period in daily life. For example, for a chronic disease, spot measurement has no problem. However, for a suddenly occurring disease, continuation of regular measurement for a constant time period, i.e., continuous measurement, can capture a predictor, and issue an alert.

The diagnoser in the biological condition diagnosis system of the present invention diagnoses the biological condition using machine learning based on extracted biological data. Accordingly, the diagnoser can use a learning model obtained by machine learning where the biological data in accordance with an attribute is adopted as an explanatory variable, and the corresponding biological condition in accordance with the attribute is adopted as an objective variable. It is conceivable that correct diagnosis can be achieved, based on much information.

BRIEF DESCRIPTION OF THE DRAWINGS

FIG. 3C is a schematic diagram for illustrating arrangement of the light emitting elements, the light receiving element and the like that constitute the reflective photoelectric plethysmography sensor according to the first embodiment.

FIG. 3D is a schematic diagram for illustrating arrangement of the light emitting elements, the light receiving element and the like that constitute the reflective photoelectric plethysmography sensor according to the first embodiment.

FIG. 4A is a schematic diagram for illustrating arrangement of a light emitting element, light receiving elements and the like that constitute a reflective photoelectric plethysmography sensor according to a second embodiment.

DETAILED DESCRIPTION

Figure 1:
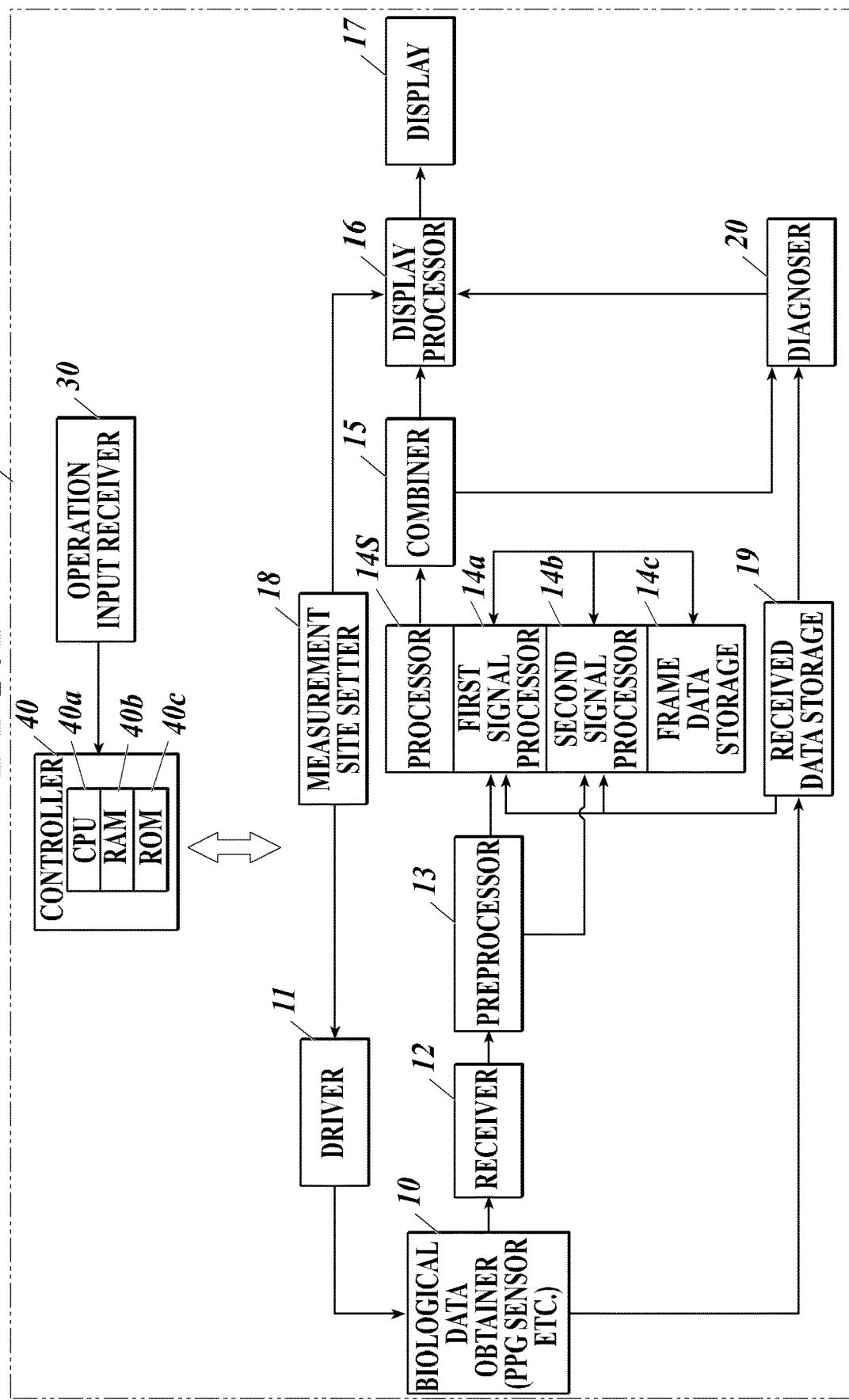
FIG. 1 is a schematic diagram of an example of an entire configuration of a biological condition diagnosis system.

A biological condition diagnosis system according to the present invention, includes, at least: an obtainer, a receiver, a preprocessor, a processor, and a diagnoser, for biological data, wherein the obtainer obtains the biological data by a reflective photoelectric plethysmography sensor, the preprocessor optimally preprocesses the obtained biological data, the processor extracts a feature point from the preprocessed data, and the diagnoser diagnoses a biological condition using machine learning, based on the extracted biological data.

The characteristics are technological characteristics common to the following embodiments.

Preferably, in an embodiment of the present invention, in view of exerting advantageous effects of the present invention, the light emitting element of the reflective photoelectric plethysmography sensor is planar, and is used as a planar light source for light with which biological tissue is illuminated. Preferably, in view of facilitating obtainment of a sensor that is flexible and has good wearing feeling, the light emitting element of the reflective photoelectric plethysmography sensor is an organic EL element. Preferably, the light receiving element of the reflective photoelectric plethysmography sensor is an organic photodiode.

Preferably, in an embodiment, in view of exerting advantageous effects of the present invention, the obtainer continuously measures and obtains the biological data. Preferably, the obtainer simultaneously measures and obtains two or more types of the biological data. Preferably, the obtainer simultaneously measures and obtains the biological data on biological sites at two or more positions.

Preferably, the system further includes a combiner that combines the obtained biological data items and generates an integrated data item.

Preferably, to allow correct diagnosis based on much information, the diagnoser uses a learning model obtained by machine learning where the biological data in accordance with an attribute is adopted as an explanatory variable, and the corresponding biological condition in accordance with the attribute is adopted as an objective variable. Preferably, the diagnoser uses a learning model using deep learning, based on the obtained biological data.

Preferably, in an embodiment of the present invention, to improve the measurement accuracy, the reflective photoelectric plethysmography sensor is a reflective photoelectric plethysmography sensor that includes the light emitting element and the light receiving element that are planar, the light emitting element and the light receiving element do not face with each other in a vertical direction, and provided that a shortest distance between the light emitting element and the light receiving element is h (mm), a thickness of skin (epidermis+dermis) of a human body is t (mm), and the thickness is within a range from 0.1 to 4 mm, the shortest distance h (mm) between at least one pair of the light emitting element and the light receiving element satisfies Expression (1) described above.

Preferably, in view of measurement accuracy, the shortest distance between the light emitting element and the light receiving element is within a range from 2 to 25 mm.

Preferably, in view of improving the robustness against positional deviation, the system further includes a plurality of the light emitting elements, wherein each of the light emitting elements is disposed on a substantially concentric circle centered on a center point of the light receiving element.

1 Entire Configuration of Biological Condition Diagnosis System of Present Invention A biological condition diagnosis system includes, at least: an obtainer, a receiver, a preprocessor, a processor, and a diagnoser, for biological data, wherein the obtainer obtains the biological data by a reflective photoelectric plethysmography sensor, the preprocessor optimally preprocesses the obtained biological data, the processor extracts a feature point from the preprocessed data, and the diagnoser diagnoses a biological condition using machine learning, based on the extracted biological data.

1.1 Entire Configuration Example of Biological Condition Diagnosis System

While the biological condition diagnosis system has the characteristics as described above, the entire configuration may be in any of various modes. Hereinafter, an example is described. However, there is no limitation to this example.

FIG. 1 is a schematic diagram of an example of the entire configuration of the biological condition diagnosis system. The biological condition diagnosis system 1 can visualize an internal condition of a subject as an image of photoelectric plethysmograph or the like, using a received signal from a biological data obtainer 10 that includes at least a reflective photoelectric plethysmography sensor (hereinafter, also called "PPG sensor").

Here, "image" according to the present invention includes the waveform, a graph and a table of pulse waves.

As shown in FIG. 1, the biological condition diagnosis system 1 includes the biological data obtainer 10, a driver 11, a receiver 12, a preprocessor 13, a processor 14S (the processor includes a first signal processor 14a, a second signal processor 14b and a frame data storage 14c), a combiner 15, a display processor 16, a display 17, a measurement site setter 18, a received data storage 19, a diagnoser 20, an operation input receiver 30, and a controller 40.

The driver 11, the receiver 12, the measurement site setter 18, the processor 14S, the combiner 15 and the display processor 16 include at least one piece of dedicated hardware (electronic circuit) in accordance with each process, such as a DSP (Digital Signal Processor), an ASIC (Application Specific Integrated Circuit and a PLD (Programmable Logic Device), for example.

The controller 40 includes a CPU (Central Processing Unit 40a serving as an operation/control device, a RAM (Random Access Memory) 40b serving as a main storage device, and a ROM (Read Only Memory) 40c. The ROM 40c stores basic programs, and basic setting data. The CPU 40a reads programs in accordance with processing content from the ROM 40c, deploys the programs on the RAM 40b, and executes the deployed programs, thus controlling operation of each of functional blocks of the biological condition diagnosis system 1 (the driver 11, the receiver 12, the measurement site setter 18, the frame data storage 14c, the received data storage 19, the display processor 16, the display 17, the first signal processor 14a and the second signal processor 14b) in a centralized manner.

In this embodiment, each of pieces of hardware constituting the functional blocks, and the controller 40 cooperate with each other, thus achieving the function of each functional block. Note that part or the entirety of each functional block may be achieved by the controller 40 executing the programs.

The biological data obtainer 10 includes at least the reflective photoelectric plethysmography sensor 2. Furthermore, in accordance with the purpose, an electrocardiographic sensor (e.g., a sensor that includes an electrode patch having an electrode to be in close contact with the skin of a test subject, allowing this test subject to wear the sensor), a blood pressure sensor, an ultrasonic sensor and the like may be included.

The biological data obtainer 10 can continuously measure and obtain the biological data. Two or more types of biological data can be simultaneously measured and obtained. The biological data on biological sites at two or more positions can be simultaneously measured and obtained.

Preferably, an interface is included for performing transmission of the biological data and the like from the biological data obtainer 10 to the receiver 12, and transmission of a drive signal from the driver 11 to the biological data obtainer 10, through wireless communication, such as of Bluetooth® or WiFi®.

In accordance with an instruction of the controller 40, the driver 11 generates the drive signal, and outputs the signal to a sensor, such as a PPG sensor. Although not shown, the driver 11 includes, for example, a clock generation circuit, a pulse generation circuit, a pulse width setter, and a delay circuit.

In accordance with an instruction of the controller 40, the receiver 12 receives a received signal from the PPG sensor or the like, and outputs the signal to the preprocessor 13, the processor 14S (the first signal processor 14a and the second signal processor 14b) and the received data storage 19. Although not shown, the receiver 12 includes, for example, an amplifier, an A/D converter, and a phasing adder circuit.

The preprocessor 13 optimally preprocesses the obtained biological data in accordance with the purpose. For example, the data is preprocessed to display the waveform of pulse waves in real time, display the waveform of acceleration pulse waves, display a power spectral density graph, and display an attractor screen.

Preferably, to allow the preprocessor 13 or the after-mentioned processor 14S to remove noise in the biological data output from the receiver 12 and improve the accuracy, preprocessing and processing are performed using a band-pass filter or a low-pass filter, and further using a moving-average method or a frequency domain method.

Based on the data preprocessed in the step described above, the processor 14S extracts feature points in the first signal processor 14a and the second signal processor 14b, which are described below, and generates processed non-image pulse wave data, image data and the like.

In accordance with an instruction of the controller 40, the first signal processor 14a applies predetermined processes to predetermined received data, e.g., on pulse waves, from the receiver 12 or the received data storage 19, and generates non-image pulse wave data, image data and the like that are intended and have been preprocessed.

For example, in accordance with the purpose, an envelope demodulation process, a logarithmic compression process and the like are applied, the dynamic range and gain are adjusted, and the brightness conversion is performed, thus generating image data and the like.

Note that the first signal processor 14a includes a DSC (Digital Scan Converter) that performs coordinate transformation and pixel interpolation in accordance with the sensor type, such as of a PPG sensor.

In accordance with an instruction of the controller 40, the second signal processor 14b applies processes similar to those in the first signal processor 14a described above, processes in another mode or the like to predetermined received data, e.g., on the properties of blood, from the receiver 12 or the received data storage 19, and generates image data. Unlike the image data described above, the image data may include brightness information, and color information.

The frame data storage 14c includes, for example, a volatile memory, such as a DRAM (Dynamic Random Access Memory), or a high-speed rewritable non-volatile memory. The frame data storage 14c stores frame data generated by the first signal processor 14a and the second signal processor 14b described above in units of frames. The frame data obtained by the signal processor may be made up of dynamic data having not been subjected to image processing yet. The dynamic data includes speed data indicating the speed of dynamics, power data indicating the flow rate, and dispersion data indicating the degree of disturbance. The frame data stored in the frame data storage 14c is read in accordance with control of the controller 40, and is subjected to predetermined image processing in the first signal processor 14a and the second signal processor 14b.

The combiner 15 combines the image data and the like obtained by the first signal processor 14a and the second signal processor 14b described above, in accordance with the purpose, and generates data allowing the entire correlativeness to be grasped.

For example, when the first signal is selected, the combiner 15 converts the first signal image data from the first signal processor 14a into a display signal, and outputs the data to the display processor 16. When the second signal is selected, the combiner 15 combines the first signal image data from the first signal processor 14a with the second signal image data from the second signal processor 14b, converts the combined second signal image data into a display signal, and outputs the converted signal to the display processor 16.

In accordance with an instruction of the controller 40, the display processor 16 converts the image data generated by the combiner 15 into a display signal in conformity with the display 17, outputs the converted signal, and displays an image on the display 17.

In conformity with the setting of a region of interest by the measurement site setter 18, the display processor 16 superimposes a measurement site frame on the first signal image or the second signal image.

The display 17 includes, for example, a liquid crystal display, an organic EL display, a CRT display or the like. In accordance with an instruction of the controller 40, the display 17 displays the processed non-image pulse wave data and image, based on the display signal from the display processor 16.

In accordance with an instruction of the controller 40, the measurement site setter 18 sets a measurement site (a region of interest (ROI)) on a measurement object (e.g., a human body).

For example, the measurement site setter 18 sets, as the region of interest, a region set by operation through the operation input receiver 30. The region of interest is set so as to include a diagnosis target (e.g., a blood flow site), is subjected to the first signal processor 14a, and is displayed as the measurement site frame on a display image. In the measurement site frame, the image having been subjected to the second signal processor 14b is displayed in a superimposed manner.

Similar to the frame data storage 14c, the received data storage 19 includes, for example, a volatile memory, such as a DRAM, or a high-speed rewritable non-volatile memory. The received data storage 19 stores received data based on the received signal from the receiver 12. Note that the frame data storage 14c and the received data storage 19 are each made up of the same storage device.

For example, the operation input receiver 30 accepts input of various types of information, such as information on diagnosis.

The operation input receiver 30 includes, for example, an operation panel that includes a plurality of input switches, a keyboard, and a mouse. Note that the operation input receiver 30 may include a touch panel provided integrally with the display 17. A user can set the region of interest, the diagnosis target site, the type of a sensor, such as a PPG sensor, and an image processing method and the like in the processor, through the operation input receiver 30.

The diagnoser 20 has a function of performing diagnosis based on the biological data displayed on the display.

The diagnoser 20 can use a learning model obtained by machine learning where the biological data in accordance with an attribute is adopted as an explanatory variable, and the corresponding biological condition in accordance with the attribute is adopted as an objective variable.

Note that the diagnoser 20 can use a learning model using deep learning, based on the obtained biological data.

Here, "machine learning" causes a machine to learn patterns and correlations of data using a large amount of data, and performs identification, recognition, detection, prediction, etc.

Machine learning models usable for the present invention include, for example, a support vector machine (called "SVM") model, a neural network (called "NNET") model, a random forest model, and a deep learning model. Among these models, the deep learning model is preferable.

For example, in analysis applied with a multiple regression model constructed with pulse wave data obtained from a test subject, such as a patient of a specific disease, being adopted as training data (learning data), multiple regression is performed with "disease probability %", "blood pressure" and the like being adopted as objective variables, and with data on feature amounts extracted from the form of pulse waves (e.g., the minimum value or the maximum value of the amplitude, the time interval from a rise point to the next rise point, frequency component extraction by FFT (Fast Fourier Transformation), MT method (Maharanobis-Taguchi System), dynamic time warping method, etc.) being adopted as explanatory variables, thus calculating the disease probability %, blood pressure and the like, which are the objective variables, from the pulse waves, and the feature amounts of simultaneously obtained other vital data.

Note that the analysis method varies on whether a numerical value is intended to be obtained or only classification is required. Preferably, suitable regression or classification, such as multiple regression analysis, principal component analysis, or PLS regression that includes both of them, is appropriately selected.

2 Reflective Photoelectric Plethysmography Sensor
2.1 Functions of Reflective Photoelectric Plethysmography Sensor The reflective photoelectric plethysmography sensor according to the present invention illuminates a site of biological tissue to be measured with light by a light emitting element, such as a light-emitting diode, serving as a light source, detects light reflected on the site of the biological tissue to be measured by a light receiving element, such as a photo diode, serving as a light detection sensor, and measures variation in plethysmogram of the biological tissue, based on the detected signal.

For example, light emitted from the light emitting element passes through epidermis and reaches blood vessels residing below the epidermis. The light having reached the blood vessels is absorbed or reflected by blood flowing in the blood vessels, or passes through the blood.

Among the light components, the light reflected by blood vessel tissue and the blood flowing in blood vessel enters the light receiving element. Accordingly, the light receiving element outputs photocurrent in accordance with the incident light intensity. Here, the blood vessel repeats expansion and contraction at the same period as that of the heartbeat. Consequently, the light reflection intensity increases and decreases at the same period as that of the expansion and contraction of the blood vessel. Accordingly, variation in photocurrent output from the light receiving element indicates the variation in volume of the blood vessel.

The reflective photoelectric plethysmography sensor according to the present invention is also applicable as a sensor that detects the oxygen saturation of arterial blood. Hemoglobin in blood has different absorbances of red light and infrared light according to presence or absence of binding with oxygen. A plurality of pairs of elements with different emission wavelengths and reception wavelengths, such as elements emitting and receiving red light and elements emitting and receiving infrared light, are prepared, and the reflected light is measured and analyzed, thereby allowing detection of the oxygen saturation.

Note that "plethysmogram" is the waveform when variation in pressure in the blood vessel due to heartbeat causes variation in volume, and allows variation in blood vessel to be directly grasped.

The "photoelectric plethysmograph" is the waveform detected using transmission or reflection of light of blood in order to detect the plethysmogram.

<Oxygen Saturation Calculating Method>

Typically, to measure the oxygen saturation in blood, the reflective photoelectric plethysmography sensor (pulse oximeter) is used. The pulse oximeter emits light having two wavelengths included in a wavelength range from red to infrared, and measures the transmittance and reflectance.

Specifically, blood hemoglobin (Hb) exists in four types of states that are of oxygenated hemoglobin ($O_2Hb$), reduced hemoglobin (HHb), methemoglobin (MetHb), and carboxyhemoglobin (COHb). MetHb and COHb are abnormal hemoglobin that are increased by methemoglobinemia or carbon monoxide poisoning. Typically, the oxygen saturation is determined by the ratio of $O_2Hb$ to $O_2Hb+HHb$.

When red light is passed through hemoglobin (Hb), the red light absorbance of HHb is significantly higher than the red light absorbance of $O_2Hb$, and largely changes in accordance with the wavelength of red light. When near-infrared light is passed through hemoglobin (Hb), the near-infrared light absorbance of HHb is slightly lower than the near-infrared light absorbance of $O_2Hb$. Accordingly, the ratio R (red light absorbance/near-infrared light absorbance) between the red light absorbance and the near-infrared light absorbance of hemoglobin changes in accordance with the oxygen saturation, which is the ratio between $O_2Hb$ and $O_2Hb+HHb$ in blood.

At measurement sites, such as a finger, a wrist, the back of an arm, a chest and an abdomen, arterial blood, venous blood, tissue and bones are present. These affect the red light and near-infrared light absorbances. Among them, a site to which variation in volume of blood vessel plethysmogram contributes is arterial blood. Provided that the absorbance at pulse wave part is AC, and the absorbance at the arterial blood non-pulsatile part, venous blood, tissue, and bones is DC, for example, the AC component of the absorbance with red light having a wavelength of 660 nm is AC660 and the DC component is DC660, for example, the AC component of the absorbance with near-infrared light having a wavelength of 940 nm is AC940 and the DC component is DC940, the ratio R (red light absorbance/near-infrared light absorbance) between the red light absorbance and the near-infrared light absorbance is represented by the following Expression (I).

[Expression 1]

$$R = \frac{\text{Red light absorbance}}{\text{Near-infrared light absorbance}} = \frac{AC660/DC660}{AC940/DC940} \quad \text{Expression (I)}$$

The blood oxygen saturation can be obtained based on the R value calculated by Expression (I) described above and on a preliminarily empirically obtained calibration curve that indicates the relationship between the R value and the percutaneous arterial blood oxygen saturation ($SpO_2$).

Typically, when a finger, a wrist (e.g., ulnar side/radial side), the back of an arm, a chest, an abdomen or the like is illuminated with red light and near-infrared light, and the absorbance is measured, the temporal change in absorbance is measured as the waveform in which pulse waves are reflected. Accordingly, the AC component of the absorbance can be identified by calculating the difference between the maximum value and the minimum value of the temporal change in absorbance. The DC component of the absorbance can be identified by calculating the average value of the temporal change in absorbance. In Example described later, the thus calculated value is described as "AC/DC".

2.2 Entire Configuration of Reflective Photoelectric Plethysmography Sensor

Any of various embodiments and modes may be adopted as the entire configuration of the reflective photoelectric plethysmography sensor.

Preferably, for example, the basic entire configuration is a configuration that includes: a light emitting element that is subjected to blinking drive at a higher frequency than a frequency of plethysmogram of a biological body, based on a signal of an oscillator, and emits light; a light receiving element that receives light reflected by biological tissue serving as a measurement object, this reflected light containing light having been emitted from the light emitting element and external light, and generates a signal having a signal level corresponding to a received light intensity; an extractor that extracts a signal component due to the external light from the signal generated by the light receiving element; a reducer that reduces a noise signal caused by the external light and the like in the signal generated by the light receiving element, by subtracting the signal component extracted by the extractor, from the signal generated by the light receiving element; and a device that generates a signal representing the plethysmogram of the biological body serving as the measurement object, based on the signal with the noise signal component having been caused by the external light and the like and reduced by the reducer.

2.2.1 Configuration Example of Main Part of Reflective Photoelectric Plethysmography Sensor The configuration of a main part of the reflective photoelectric plethysmography sensor may be any of conventionally publicly known various embodiments. Preferably, according to the present invention, the sensor is a sensor that has an embodiment satisfying the following requirements.

<Distance Between Light Emitting Element and Light Receiving Element>

Preferably, the reflective photoelectric plethysmography sensor is a reflective photoelectric plethysmography sensor that includes the light emitting element and the light receiving element that are planar, the light emitting element and the light receiving element do not face with each other in a vertical direction, and provided that a shortest distance between the light emitting element and the light receiving element is h (mm), a thickness of skin (epidermis+dermis)

of a human body is t (mm), and the thickness is within a range from 0.1 to 4 mm, the shortest distance h (mm) between at least one pair of the light emitting element and the light receiving element satisfies the following Expression (1).

$$(t \times 0.7)^2 \leq h \leq (t \times 1.3)^2 \quad \text{Expression (1):}$$

Expression (1) described above means that the shortest distance between the light emitting element and the light receiving element is the length "within a range of the square of ±30% of the numerical value of the thickness of the skin". In Expression (1) described above, h and t represent only numerical values.

The description that "the light emitting element and the light receiving element do not face with each other (in a vertical direction)" means that the light emitting element and the light receiving element are not arranged to face each other in an overlaid manner in the vertical direction, and are juxtaposed in a planar direction.

Figure 2:
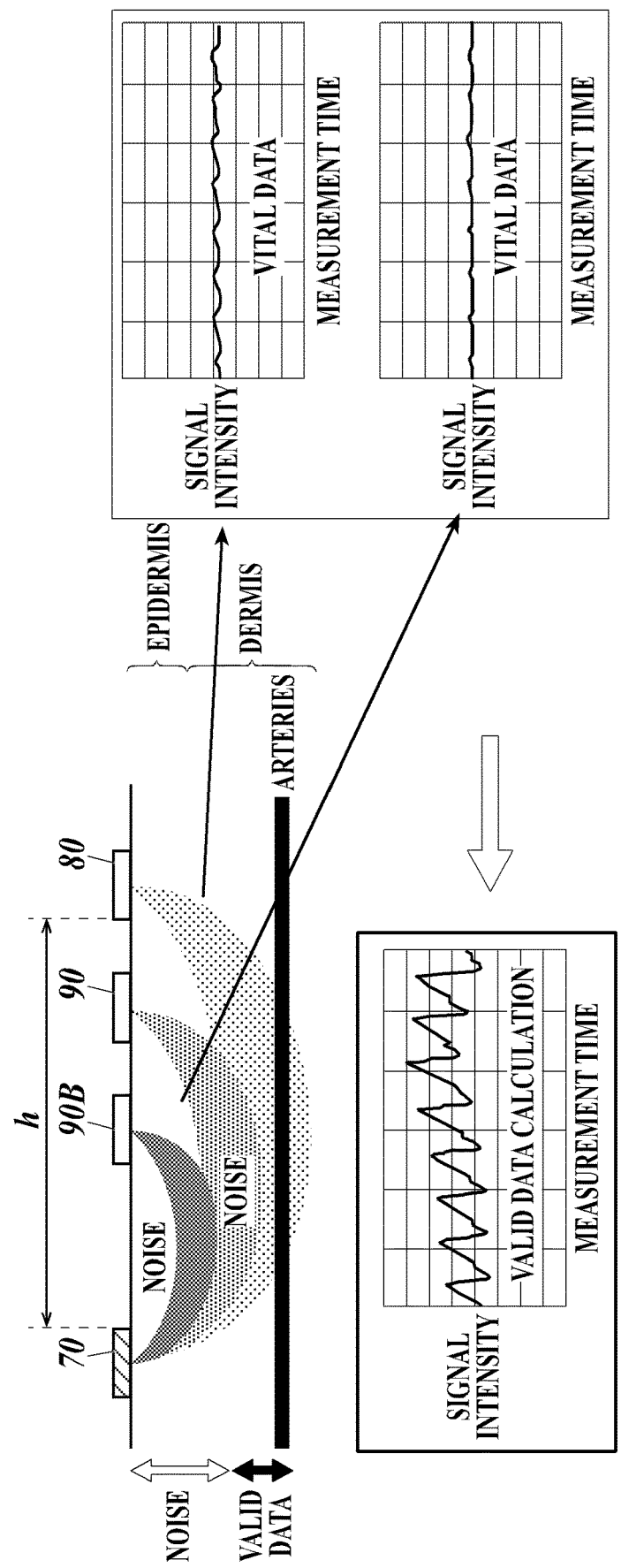
FIG. 2 is a schematic diagram for illustrating the relationship between the shortest distance between a light emitting element and a light receiving element of a reflective photoelectric plethysmography sensor, and the thickness of skin.

FIG. 2 is a schematic diagram for illustrating the relationship between the shortest distance between the light emitting element and the light receiving element, and the thickness of skin.

In the present invention, "the thickness of skin of a human body" indicates the total thickness of the thickness of epidermis of the human body and the thickness of dermis, and the thickness of the skin is assumed to be within a range from 0.1 to 4 mm.

In the present invention, as shown in FIG. 2, in a side sectional view, "the shortest distance between the light emitting element and the light receiving element" indicates the shortest distance h (mm) from a side edge of the light receiving element 70 that is closer to the light emitting element 80, to a side edge of the light emitting element 80 that is closer to the light receiving element 70.

FIG. 2 shows, as an example, a case where for one light receiving element 70, a plurality of light emitting elements 80, 90 and 90B are provided. The shortest distance h (mm) between the light receiving element 70 and the light emitting element 80 is within a range satisfying Expression (1) described above.

Note that the shortest distance between the light receiving element 70 and the light emitting element 90, or the shortest distance between the light receiving element 70 and the light emitting element 90B is not in the range satisfying Expression (1) described above.

Accordingly, as described later, biological body information (vital data) obtained based on light emitted from the light emitting elements 90 and 90B, which do not satisfy the range of the shortest distance defined in the present invention, contains noise, and valid vital data can be calculated by subtracting the vital data containing the noise from vital data obtained based on light emitted from the light emitting element 80 satisfying the range of the shortest distance.

Preferably, in view of measurement accuracy, the shortest distance between the light emitting element and the light receiving element is in a range from 2 to 25 mm. Preferably, in view of improvement of robustness against positional deviation, a plurality of the light emitting elements are provided, and each of the light emitting elements is disposed in a substantially concentric circle centered on the center point of the light receiving element. In particular, in view of the device size, it is preferable that the upper limit value of the shortest distance be 17.5 mm or less, it is further preferable that the value be 10 mm or less.

<Arrangement Example of Light Emitting Element, Light Receiving Element, Etc.>

The arrangement of the light emitting element and the light receiving element according to the present invention is not limited only if the condition described above is satisfied. However, a preferable arrangement example is described below.

A first embodiment described below is a case where a plurality of light emitting elements are arranged in a substantially concentric circle centered on the center point of a light receiving element. A second embodiment is a case where a plurality of light receiving elements are arranged in a substantially concentric circle centered on the center point of a light emitting element.

Here, "in a substantially concentric circle" means that the difference in the distance (radius) from the center point of the light receiving element to the center point of each light emitting element is within 10%, preferably, within 5%, and further preferably, within 3%, and also includes an identical case.

The "center point of the light receiving element" means a geometric center of the shape of the light receiving element in planar view of the light receiving element. The "center point of the light emitting element" means a geometric center of the shape of the light receiving element in a planar view of the light emitting element.

Note that "planar view" is view of the reflective photoelectric plethysmography sensor in the direction of the normal with respect to an upper surface of a substrate 41.

First Embodiment

Figure 3A:
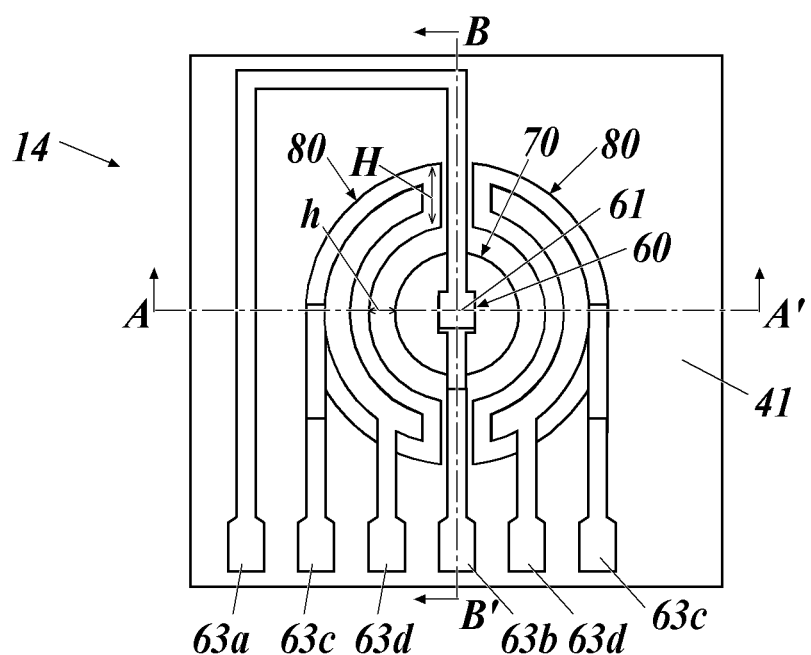
FIG. 3A is a schematic diagram for illustrating arrangement of light emitting elements, a light receiving element and the like that constitute a reflective photoelectric plethysmography sensor according to a first embodiment.
Figure 3B:
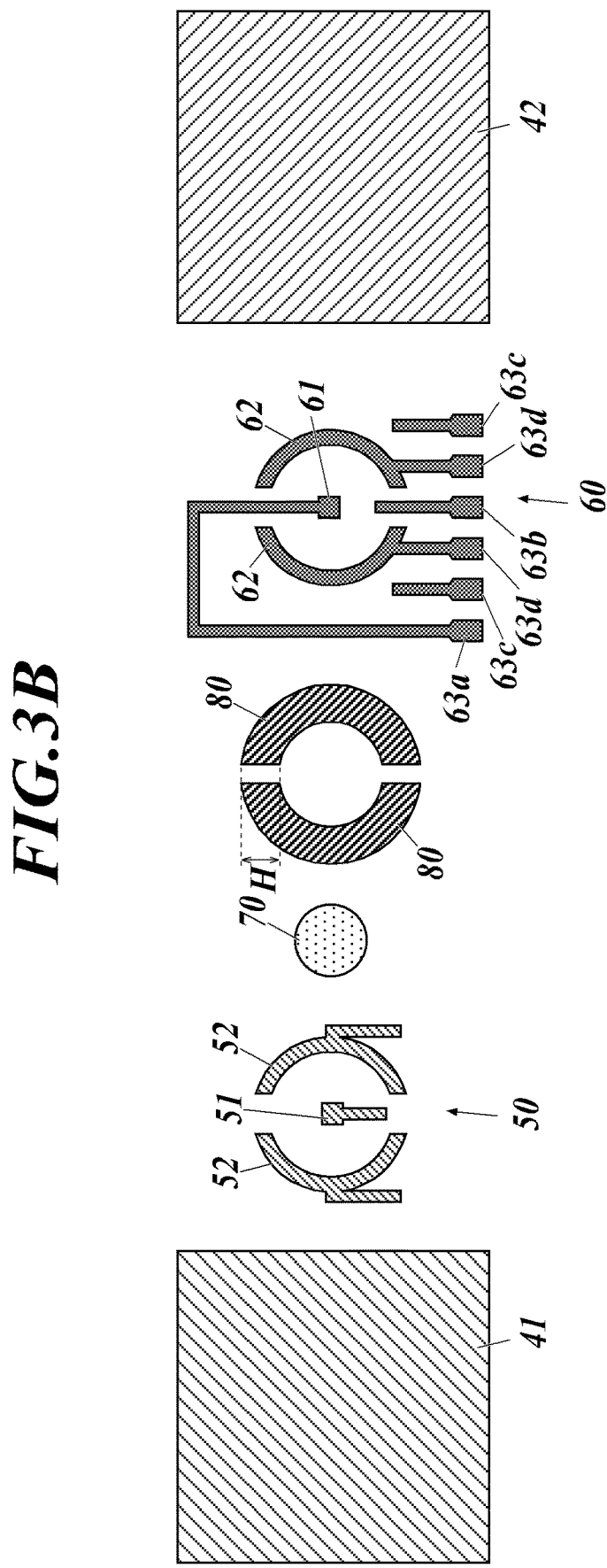
FIG. 3B is a schematic diagram for illustrating arrangement of the light emitting elements, the light receiving element and the like that constitute the reflective photoelectric plethysmography sensor according to the first embodiment.

FIGS. 3A, 3B, 3C and 3D are schematic diagrams for illustrating an arrangement of light emitting elements, a light receiving element and the like that constitute a reflective photoelectric plethysmography sensor. FIG. 3A is a plan view. FIG. 3B is a plan view of components in an exploded manner. FIG. 3C is a sectional view taken along line A-A'. FIG. 2D is a sectional view taken along line B-B'.

As shown in FIGS. 3A, 3B, 3C and 3D, a detector 14 includes a light-transmissive substrate 41, on which a light transmitting first electrode (positive electrode) 50, and a plurality of extraction electrodes 63a, 63b, 63c and 63d of a second electrode (negative electrode) 60 are formed.

Preferably, a substrate having a total luminous transmittance of 70% or higher, more preferably 80% or higher, and particularly preferably 90% or higher is adopted as the light-transmissive substrate 41. The total luminous transmittance can be measured according to JIS K 7375:2008 "Plastics—Determination of total luminous transmittance and reflectance". A non-transmissive substrate (light-reflective substrate) may be, for example, a metal plate, such as of aluminum or stainless steel, a film, a non-transmissive resin substrate, or a substrate made of a ceramic.

In FIG. 3B, the first electrode 50 includes: a first central electrode 51 formed at the center of the light-transmissive substrate 41; and first circumferential electrodes 52 and 52 arranged on a concentric circle on the left side and the right side centered at the first central electrode 51.

The first circumferential electrodes 52 and 52 have arc shapes in plan view, and are formed uninterruptedly so that the first circumferential electrodes 52 and 52 are not continuous to each other.

The first central electrode 51 is formed to extend toward the extraction electrode 63b. Furthermore, the two first circumferential electrodes 52 and 52 are also formed to extend toward the respective extraction electrodes 63c.

The extraction electrodes 63a, 63b, 63c and 63d are formed on the light-transmissive substrate 41, and are configured as wiring to be extracted to the side edge of the light-transmissive substrate 41.

The light receiving element 70 is formed on the first central electrode 51 of the first electrode 50 so as to cover the first central electrode 51. The light receiving element 70 has a circular shape in plan view.

Preferably, an organic thin-film photovoltaics (OPV) or an organic photodiode (OPD) on a plane is used as the light receiving element 70. In particular, use of an organic photodiode is preferable in flexibility and favorable wearing feeling, and in reduction in wavelength variation and brightness variation. The details of the organic thin-film photovoltaics and the organic photodiode are described later.

The light emitting elements 80 and 80 are respectively formed on the two left and right first circumferential electrodes 52 and 52 of the first electrode 50 so as to cover these first circumferential electrodes 52 and 52. The light emitting elements 80 and 80 respectively have arc shapes in plan view along the first circumferential electrodes 52 and 52, and are formed unintermittently so that the light emitting elements 80 and 80 are not continuous to each other.

Thus, the two light emitting elements 80 and 80 formed on the respective first circumferential electrodes 52 and 52 are arranged on a concentric circle centered on the center point of the light receiving element 70.

Here, the shortest distance h (mm) between at least one pair of the light emitting element 80 and the light receiving element 70 satisfies Expression (1) described above.

As described above, in a side sectional view of FIG. 1, "the shortest distance h" between the light emitting element 80 and the light receiving element 70 indicates the shortest distance h from a side edge of the light receiving element 70 that is closer to the light emitting element 80 to a side edge of the light emitting element 80 that is closer to the light receiving element 70.

In FIG. 3, the light receiving element 70 has a circular shape in plan view, and the light emitting elements have arc shapes in plan view. Accordingly, the shortest distance h is between the outer peripheral surface of the light receiving element 70 and the inner peripheral surface of the light emitting element 80. Note that in a case where the light emitting element 80 has a circular shape in plan view, the shortest distance is between the outer peripheral surface of the light receiving element 70 and the outer peripheral surface of the light emitting element 80.

Preferably, a light-emitting diode (LED) or an organic EL element (OLED) is used as the light emitting element 80. In particular, use of an organic EL element is preferable in view of capability of reducing the wavelength variation and the brightness variation.

Preferably, elements emitting light with the same wavelength are used as the two light emitting elements 80 and 80.

A second electrode 60 is further formed on the light receiving element 70 and the light emitting elements 80 and 80.

The second electrode (negative electrode) 60 includes: a second central electrode 61 formed at a position corresponding to the first central electrode 51 of the first electrode 50; and two second circumferential electrodes 62 and 62 that are respectively formed around the second central electrode 61 at positions corresponding to the first circumferential electrodes 52 and 52, have arc shapes in plan view, and achieve unintermittent encirclement.

An extraction electrode 63a is connected to the second central electrode 61. The extraction electrode 63a is formed so as to pass through a gap between the second circumferential electrodes 62 and 62 on the light-transmissive substrate 41, go around one second circumferential electrode 62, and extend toward a side edge of the light-transmissive substrate 41.

The extraction electrodes 63d and 63d are respectively connected to the ends of the two second circumferential electrodes 62 and 62. The extraction electrodes 63d and 63d are formed to extend toward the side edge of the light-transmissive substrate 41.

As for the first electrode 50, the extraction electrodes 63a to 63d, the light receiving element 70, the light emitting elements 80 and the second electrode 60, which are thus formed on the light-transmissive substrate 41, a light-transmissive substrate 42 is further provided on the second electrode 60, and the gap between the two light-transmissive substrates 41 and 42 are sealed with a sealer 43.

In FIG. 3, a symbol H indicates "shortest lateral width" of the light emitting element 80 in plan view. Here, since the light emitting element 80 has an arc shape in plan view, this width is the length of a line between tangent lines of the outer peripheral surface and the inner peripheral surface of the arc shape. Preferably, the shortest lateral width H of the light emitting element 80 in FIG. 3 is about 5 mm. Note that in a case where the light emitting element has a circular shape in plan view, the diameter of the circle is the shortest lateral width H.

Second Embodiment

A second embodiment is a case where a plurality of light receiving elements are arranged centered at a light emitting element as described above. The other components are similar to those in the first embodiment.

Figure 4B:
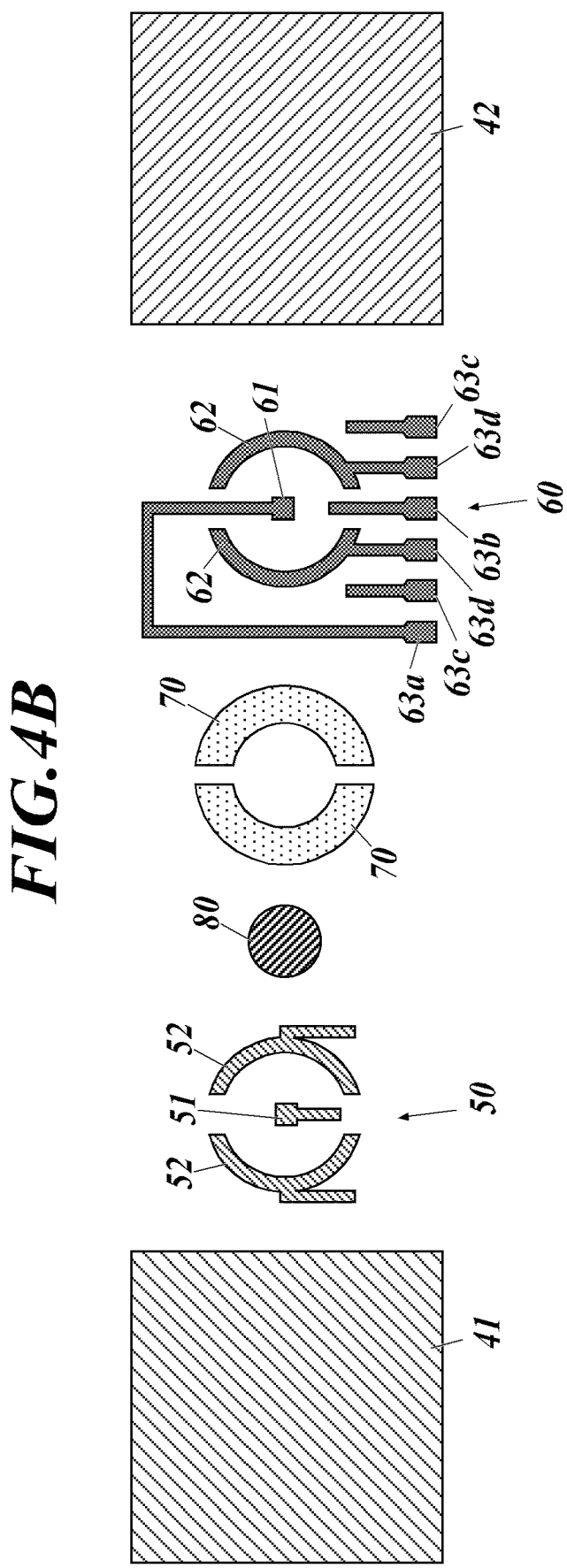
FIG. 4B is a schematic diagram for illustrating arrangement of the light emitting element, the light receiving elements and the like that constitute the reflective photoelectric plethysmography sensor according to the second embodiment.
Figure 4C:
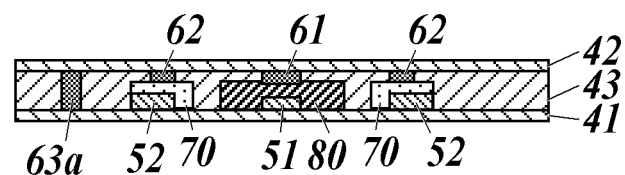
FIG. 4C is a schematic diagram for illustrating arrangement of the light emitting element, the light receiving elements and the like that constitute the reflective photoelectric plethysmography sensor according to the second embodiment.
Figure 4D:
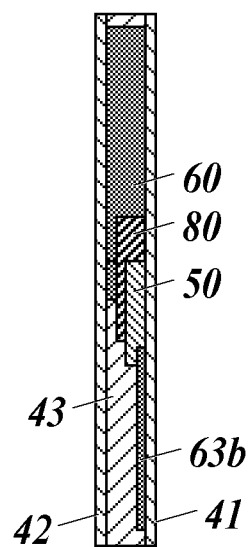
FIG. 4D is a schematic diagram for illustrating arrangement of the light emitting element, the light receiving elements and the like that constitute the reflective photoelectric plethysmography sensor according to the second embodiment.

FIGS. 4A, 4B, 4C and 4D are schematic diagrams for illustrating an arrangement of the light emitting element, the light receiving elements and the like that constitute a reflective photoelectric plethysmography sensor. FIG. 4A is a plan view. FIG. 4B is a plan view of components in an exploded manner. FIG. 4C is a sectional view taken along line C-C'. FIG. 4D is a sectional view taken along line D-D'.

As shown in FIGS. 4A, 4B, 4C and 4D, a detector 14 includes a light-transmissive substrate 41, on which a light transmitting first electrode (positive electrode) 50, and a plurality of extraction electrodes 63a, 63b, 63c and 63d of a second electrode (negative electrode) 60 are formed.

The first electrode 50 includes: a first central electrode 51 formed at the center of the light-transmissive substrate 41; and first circumferential electrodes 52 and 52 arranged on a concentric circle centered at the first central electrode 51.

The first circumferential electrodes 52 and 52 have arc shapes in plan view, and are formed unintermittently so that the first circumferential electrodes 52 and 52 are not continuous to each other.

The first central electrode 51 is formed to extend toward the extraction electrode 63b. Furthermore, the two first circumferential electrodes 52 and 52 are also formed to extend toward the respective extraction electrodes 63c.

The extraction electrodes 63a, 3b, 63c and 63d are formed on the light-transmissive substrate 41, and are configured as wiring to be extracted to the side edge of the light-transmissive substrate 41.

The light emitting element 80 is formed on the first central electrode 51 of the first electrode 50 so as to cover the first central electrode 51. The light emitting element 80 has a circular shape in plan view.

The light receiving elements 70 and 70 are respectively formed on the two first circumferential electrodes 52 and 52 of the first electrode 50 so as to cover these first circumferential electrodes 52 and 52. The light receiving elements 70 and 70 respectively have arc shapes in plan view along the first circumferential electrodes 52 and 52, and are formed unintermittently so that the light receiving elements 70 and 70 are not continuous to each other.

Thus, the two light receiving elements 70 and 70 formed on the respective first circumferential electrodes 52 and 52 are arranged on a concentric circle centered on the light emitting element 80.

A second electrode 60 is further formed on the light receiving element 70 and the light emitting elements 80 and 80.

The second electrode (negative electrode) 60 includes: a second central electrode 61 formed at a position corresponding to the first central electrode 51 of the first electrode 50; and two second circumferential electrodes 62 and 62 that are respectively formed around the second central electrode 61 at positions corresponding to the first circumferential electrodes 52 and 52, have arc shapes in plan view, and achieve unintermittent encirclement.

An extraction electrode 63a is connected to the second central electrode 61. The extraction electrode 63a is formed so as to pass through a gap between the second circumferential electrodes 62 and 62 on the light-transmissive substrate 41, go around one second circumferential electrode 62, and extend toward a side edge of the light-transmissive substrate 41.

The extraction electrodes 63d and 63d are respectively connected to the ends of the two second circumferential electrodes 62 and 62. The extraction electrodes 63d and 3d are formed to extend toward the side edge of the light-transmissive substrate 41.

As for the first electrode 50, the extraction electrodes 63a to 63d, the light receiving element 70, the light emitting elements 80 and the second electrode 60, which are thus formed on the light-transmissive substrate 41, a light-transmissive substrate 42 is further provided on the second electrode 60, and the gap between the two light-transmissive substrates 41 and 42 are sealed with a sealer 43.

Note that in the embodiments of the present invention, in view of improvement in measurement accuracy, it is preferable that a plurality of the light emitting elements be provided, at least two of the light emitting elements among the plurality of light emitting elements emit light having the same wavelength, and be capable of separately emitting a plurality of the light emitting elements.

Preferably, in view of improvement in measurement accuracy, information and data obtained based on light beams respectively emitted from the light emitting element arranged closer to the light receiving element and the light emitting element arranged more apart from the light emitting element among a plurality of the light emitting elements are processed, which can calculate valid data obtained by subtracting noise.

The robustness against positional deviation can be improved by the system that further includes a plurality of the light receiving elements, wherein each of the light receiving elements is disposed on a substantially concentric circle centered on the center point of the light emitting element.

Preferably, in view of improvement in measurement accuracy, information and data obtained based on light beams respectively received from the light receiving element arranged closer to the light emitting element and the light receiving element arranged more apart from the light emitting element among a plurality of the light receiving elements are processed, which can calculate valid data obtained by subtracting noise.

Preferably, in view of improvement in measurement accuracy, multiple types of the shortest distances between the light emitting element and the light receiving elements are present, and the light emitting element and the light receiving element having the shortest distance suitable for sensing is selected.

2.3 Components of Reflective Photoelectric Plethysmography Sensor

Among various types of components of the reflective photoelectric plethysmography sensor, the light emitting element and the light receiving elements, which are main components, are described in detail.

<Light Emitting Element>

In the present invention, the light emitting element is used as a light source of light with which biological tissue is to be illuminated.

Any of an organic light-emitting diode (OLED) and an inorganic light-emitting diode (LED) may be adopted as the light emitting element. Although not specifically limited, it is preferable, in view of achieving flexibility and favorable wearing feeling and reducing the wavelength variation and brightness variation, to adopt an organic electroluminescent diode (also called "OLED", "organic EL element" and "organic photodiode"), which is a light emitting element including planar organic layers, as the light emitting element according to the present invention.

In particular, it is preferable to adopt a configuration where a wavelength conversion filter that converts visual light of the organic EL element into near-infrared light (IR) is arranged on the organic EL element that emits red light.

An LED and a light guide plate may be adopted as a planar light emitting element. Backlight for a display is according to a scheme where an LED is arranged at an edge of a light guide plate, and light enters a side edge of the light guide plate.

Furthermore, a micro-LED may be used at a resolution to an extent of being recognized as a plane. Further preferably, a scattering layer is provided in order to alleviate local increase in brightness directly above an LED.

(Organic EL Element)

An organic EL element suitable for the present invention may be, for example, a configuration that includes a positive electrode and a negative electrode on a flexible resin substrate, and an organic functional layer group including a light emitting layer intervene between the positive electrode and the negative electrode residing at opposite positions. Furthermore, in accordance with the purpose, the configuration may be achieved where functional layers, such as a sealing member, a gas barrier layer, and an optical pickup layer, are appropriately combined.

Typical configuration examples of the organic EL element according to the present invention are listed below. However, the configurations of the organic EL elements applicable to the present invention are not limited to the configurations listed in the examples.

(1) Positive electrode/light emitting layer/negative electrode
(2) Positive electrode/light emitting layer/electronic transport layer/negative electrode
(3) Positive electrode/hole transport layer/light emitting layer/negative electrode
(4) Positive electrode/hole transport layer/light emitting layer/electronic transport layer/negative electrode (5) Positive electrode/hole transport layer/light emitting layer/electronic transport layer/electron injection layer/negative electrode (6) Positive electrode/hole injection layer/hole transport layer/light emitting layer/electronic transport layer/negative electrode (7) Positive electrode/hole injection layer/hole transport layer/(electronic blocking layer/)light emitting layer/(hole blocking layer/)electronic transport layer/electron injection layer/negative electrode An electric field is applied to the organic EL element from the outside, holes are injected from the positive electrode to the hole transport layer, and electrons are injected into the electronic transport layer from the negative electrode. The injected carriers move by hopping between molecules. Holes and electrons are recombined in the light emitting layer, and electrically neutral excitons are generated. The excitons emit light in conformity with the luminescent quantum efficiency, and are radiation-deactivated. The light generated in the organic layers is taken out from the optical pickup surface to air.

Specific details of and a method of manufacturing each of the component layers that constitute an organic EL element applicable to the present invention are not specifically limited. Publicly known configuration materials and manufacturing methods are applicable. For example, details described in JP 2013-089608A, JP 2014-120334A, JP 2015-201508A, WO 2018/51617 and the like can be referred to.

(Wavelength Conversion Filter)

Preferably, the organic EL element according to the present invention is provided with a wavelength conversion filter that converts visible light of an organic EL element into near-infrared light.

Preferably, the wavelength conversion filter according to the present invention contains a luminescent material having a wavelength conversion capability (e.g., luminescent pigments etc.). The modes and manufacturing method for the wavelength conversion filter according to the present invention are not specifically limited only if the filter contains luminous pigments having a wavelength conversion capability. The modes and methods are appropriately determined in accordance with the object and usage.

Preferably, the wavelength conversion filter according to the present invention has a function of absorbing light from an organic EL element that emits light within a range of a visible light region accompanying a near-infrared light region (380 to 780 nm), preferably green to red region accompanying a near-infrared light region (495 to 750 nm), particularly preferably a red region (600 to 700 nm), and converting the light into near-infrared light, for example, near-infrared light in a region exceeding 700 nm and equal to or lower than 1500 nm, further preferably near-infrared light having an emission maximum around 850 nm.

A method may be adopted by separately manufacturing the wavelength conversion filter and the organic EL element and then pasting them. Alternatively, the wavelength conversion filter may be applied directly on the organic EL element, thus achieving lamination. If required, a cut filter for removing light having not been wavelength-converted and having been emitted may be laminated or included.

Preferably, in view of maintaining reduction in size and flexibility, the thickness of the wavelength conversion filter according to the present invention is in a range from 0.01 to 1000 μm, more preferably in a range from 1 to 500 μm, and further preferably in a range from 10 to 300 μm.

If required, the wavelength conversion filter according to the present invention contains not only luminescent pigments, but also publicly known various additives, such as colorant, light stabilizer, antioxidant agent, surfactant, flame retardant, inorganic additive, transparency agent, ultraviolet absorber, filler, and light scattering particles.

<Light Receiving Element>

The light receiving element according to the present invention serves as a sensor that detects light reflected by the biological tissue in light having been emitted from the light emitting element to the biological tissue, and converts the light into electricity.

Preferably, a planar organic photodiode (OPD) or organic thin-film photovoltaics (organic photovoltaics: OPV) is used as the light receiving element. In particular, use of OPD is preferable in flexibility and favorable wearing feeling, and in reduction in wavelength variation and brightness variation.

(1) Organic Photodiode

A conventionally publicly known organic photodiode (OPD) may be adopted as the light receiving element according to the present invention.

For example, the organic photodiode includes, as basic components: a positive electrode made up of a light transmitting resin, or a transparent conductive film, such as of ITO (Indium-Tin Oxide), formed by sputtering, resistance heating deposition or the like, on a substrate made of glass or the like; a photoelectric conversion layer having a configuration made by film-forming an electron-donating layer and an electron-accepting layer on the positive electrode by resistance heating deposition or the like; and a negative electrode made of metal further formed thereon by resistance heating deposition or the like in the same manner.

When the organic photodiode having such a configuration is illuminated with light, light absorption is performed in a photoelectric conversion region, and excitons are formed. Subsequently, carriers are separated, electrons are moved to the negative electrode through the electron-accepting layer, and holes are moved to the positive electrode through the electron-donating layer. An electromotive force occurs between the opposite electrodes. By connecting an external circuit, an electric signal can be captured.

The photoelectric conversion layer may be made up of a single layer or multiple layers. The photoelectric conversion layer may have, for example, any of various combinations of intrinsic layer (I-layer), p-type layer/I-layer, I-layer/n-type layer, p-type layer/I-layer/n-type layer, p-type layer/n-type layer and the like.

For example, what has a structure described in FIG. 13D in US 2017/0156651A may be used. Various types of organic materials used for organic photodiodes can be discussed with reference to JP 2017-532546A, JP 2006-261172A, etc.

(2) Organic Thin-Film Photovoltaics

Organic thin-film photovoltaics (OPV) in conventionally publicly known various modes may be adopted as the light receiving element according to the present invention.

For example, a bulk heterojunction type organic photoelectric conversion element may be adopted that has a basic configuration where a positive electrode that is a transparent electrode, a hole transport layer, a photoelectric conversion layer that is a bulk heterojunction layer, an electronic transport layer, and a negative electrode are sequentially laminated on one surface of a substrate.

Note that another layer that is a hole blocking layer, an electron blocking layer, an electron injection layer, a hole injection layer, a smoothing layer or the like may be further included.

Note that the photoelectric conversion layer is a layer that converts light energy into electric energy, and is configured to include a bulk heterojunction layer where a p-type semiconductor material and an n-type semiconductor material are uniformly mixed.

The p-type semiconductor material relatively functions as an electron donor (donor). The n-type semiconductor material relatively functions as an electron acceptor (acceptor).

Here, the electron donor and the electron acceptor are "an electron donor and an electron acceptor in which electrons move from the electron donor to the electron acceptor when light is absorbed and which form pairs of holes and electrons (charge separation state)". Unlike electrodes, the donor and acceptor do not simply supply or accept electrons, but supply or accept electrons through photoreaction.

For the sake of further improving the solar light utilization rate (photoelectric conversion efficiency), a tandem type configuration where such photoelectric conversion elements are laminated (a configuration including multiple bulk heterojunction layers) may be adopted.

The p-type semiconductor material may be any of various condensed polycyclic aromatic compounds and conjugated system compounds.

Examples of n-type semiconductor material include high polymer compound that includes, as a skeleton, fullerene, octaethylporphyrin, perfluorinated body of p-type semiconductor, naphthalene tetracarboxylic anhydride, naphthalene tetracarboxylic acid diimide, perylenetetracarboxylic acid anhydride, perylenetetracarboxylic acid diimide, and other aromatic carboxylic acid anhydride, and imide compounds thereof.

2.4 Pulse Wave Measurement Example by Reflective Photoelectric Plethysmography Sensor Examples of pulse wave measurement by the reflective photoelectric plethysmography sensor according to the present invention, and advantageous effects of the measurement are described.

Reflective photoelectric plethysmography sensors 1 to 11 where the shortest distance h (mm) between the light emitting element and the light receiving element was changed were designed. Each sensor was worn at the back of an arm, a wrist ulnar side, a wrist radial side, an abdomen, and a chest, and AC/DC values describe later were measured.

Specifically, "KPD30S (made by Kyoto Semiconductor Co., Ltd.)" was used as the light receiving element. A wavelength conversion film was pasted on an OLED panel (peak wavelength 630 nm) of 60×80 mm, and a ring-shaped light source where masking was applied on a device achieving a peak wavelength of 790 nm so as to cut off light except that at a ring was obtained, and this ring-shaped light source was used as the light emitting element.

The light receiving element was arranged and fixed at the center of the ring-shaped light source. The ring diameter was adjusted so that the shortest distance h between the light receiving element and the ring-shaped light source was as shown in Tables I and II. Thus, the reflective photoelectric plethysmography sensors 1 to 11 having structures as shown in FIG. 3 were obtained. The width of the ring-shaped light source (shortest lateral width H) was 2 mm. The light intensity was adjusted between 25 to 100 mA/m$^2$. A preferable condition in accordance with each distance was used. The sensitivity of the sensor was adjusted in accordance with the light intensity.

Measurement was performed at a sampling frequency of 500 Hz for 60 seconds, and analysis was performed offline. For sampling, an analog front end (AFE) "AFE4403EVM (made by Texas Instruments Inc.)" was used and sampling was achieved. AC/DC calculation was as described later. For each of the back of an arm, a wrist ulnar side, a wrist radial side, an abdomen, and a chest, an average value through ten-time measurement was calculated.

On the circuit side, a bandpass filter or a low-pass filter was used. For data processing, a moving-average and frequency domain methods were used.

It was assumed that the thickness t (epidermis+dermis) of human skin at the back of an arm where wearing was made was 4 (mm), the thickness t of the human skin on a wrist ulnar side was 3.5 (mm), the thickness t of the human skin on a wrist radial side was 3 (mm), the thickness t of the human skin at the abdomen was 2.5 mm, and the thickness t of the human skin at the chest was 2 (mm).

<AC/DC>

As described in the aforementioned "<Oxygen saturation calculating method>", the AC component of the absorbance was identified by calculating the difference between the maximum value and the minimum value of the temporal change in absorbance. The DC component of the absorbance was identified by calculating the average value of the temporal change in absorbance. According to (AC component of absorbance)/(DC component of absorbance), the AC/DC value was calculated, and listed in Tables I and II shown below.

It is practically preferable that in the present invention, the AC/DC value be in a range of 0.20%, particularly preferably 0.30% or higher. In view of the device size, it is practically preferable that the value be 0.80% or less.

TABLE I

| | Wearing site | Human skin thickness (mm) | Photoelectric plethysmography sensor No. | Shortest distance between light receiving element and light emitting element (mm) | Expression (1) satisfied or not | Average AC/DC(%) |
|---|---|---|---|---|---|---|
| Comparative example 1 | Back of arm | 4 | 1 | 2.5 | DD | 0.02 |
| Comparative example 2 | Back of arm | 4 | 2 | 5 | DD | 0.06 |
| Comparative example 3 | Back of arm | 4 | 3 | 7.5 | DD | 0.12 |
| Example 1 | Back of arm | 4 | 4 | 10 | AA | 0.20 |
| Example 2 | Back of arm | 4 | 5 | 12.5 | AA | 0.26 |
| Example 3 | Back of arm | 4 | 6 | 15 | AA | 0.33 |
| Example 4 | Back of arm | 4 | 7 | 17.5 | AA | 0.39 |
| Example 5 | Back of arm | 4 | 8 | 20 | AA | 0.44 |
| Example 6 | Back of arm | 4 | 9 | 22.5 | AA | 0.49 |
| Example 7 | Back of arm | 4 | 10 | 25 | AA | 0.50 |

TABLE I-continued

| | Wearing site | Human skin thickness (mm) | Photoelectric plethysmography sensor No. | Shortest distance between light receiving element and light emitting element (mm) | Expression (1) satisfied or not | Average AC/DC(%) |
|---|---|---|---|---|---|---|
| Comparative example 4 | Wrist ulnar | 3.5 | 1 | 2.5 | DD | 0.06 |
| Comparative example 5 | Wrist ulnar | 3.5 | 2 | 5 | DD | 0.12 |
| Example 8 | Wrist ulnar | 3.5 | 3 | 7.5 | AA | 0.22 |
| Example 9 | Wrist ulnar | 3.5 | 4 | 10 | AA | 0.35 |
| Example 10 | Wrist ulnar | 3.5 | 5 | 12.5 | AA | 0.49 |
| Example 11 | Wrist ulnar | 3.5 | 6 | 15 | AA | 0.58 |
| Example 12 | Wrist ulnar | 3.5 | 7 | 17.5 | AA | 0.68 |
| Example 13 | Wrist ulnar | 3.5 | 8 | 20 | AA | 0.73 |
| Comparative example 6 | Wrist radial | 3 | 1 | 2.5 | DD | 0.10 |
| Example 14 | Wrist radial | 3 | 2 | 5 | AA | 0.20 |
| Example 15 | Wrist radial | 3 | 3 | 7.5 | AA | 0.36 |
| Example 16 | Wrist radial | 3 | 4 | 10 | AA | 0.54 |
| Example 17 | Wrist radial | 3 | 5 | 12.5 | AA | 0.66 |
| Example 18 | Wrist radial | 3 | 6 | 15 | AA | 0.80 |
| Comparative example 7 | Wrist radial | 3 | 7 | 17.5 | DD | 0.91 |
| Comparative example 8 | Wrist radial | 3 | 8 | 20 | DD | 0.98 |

TABLE II

| | Wearing site | Human skin thickness (mm) | Photoelectric plethysmography sensor No. | Shortest distance between light receiving element and light emitting element (mm) | Expression (1) satisfied or not | Average AC/DC(%) |
|---|---|---|---|---|---|---|
| Comparative example 9 | Abdomen | 2.5 | 1 | 2.5 | DD | 0.19 |
| Example 19 | Abdomen | 2.5 | 2 | 5 | AA | 0.38 |
| Example 20 | Abdomen | 2.5 | 3 | 7.5 | AA | 0.60 |
| Example 21 | Abdomen | 2.5 | 4 | 10 | AA | 0.79 |
| Comparative example 10 | Abdomen | 2.5 | 5 | 12.5 | DD | 0.94 |
| Comparative example 11 | Abdomen | 2.5 | 6 | 15 | DD | 1.10 |
| Comparative example 12 | Abdomen | 2.5 | 7 | 17.5 | DD | 1.20 |
| Comparative example 13 | Abdomen | 2.5 | 8 | 20 | DD | 1.24 |
| Example 22 | Chest | 2 | 11 | 2 | AA | 0.23 |
| Example 23 | Chest | 2 | 1 | 2.5 | AA | 0.32 |
| Example 24 | Chest | 2 | 2 | 5 | AA | 0.52 |
| Comparative example 14 | Chest | 2 | 3 | 7.5 | DD | 0.81 |
| Comparative example 15 | Chest | 2 | 4 | 10 | DD | 0.96 |
| Comparative example 16 | Chest | 2 | 5 | 12.5 | DD | 1.11 |
| Comparative example 17 | Chest | 2 | 6 | 15 | DD | 1.24 |
| Comparative example 18 | Chest | 2 | 7 | 17.5 | DD | 1.34 |
| Comparative example 19 | Chest | 2 | 8 | 20 | DD | 1.40 |

As illustrated in the result described above, it is shown that as the shortest distance h is set larger, the AC/DC value increases. However, if the shortest distance h is set too large, the effect of attenuating the light intensity becomes large, the power consumption increases, the signal intensity itself decreases, and susceptibility to the noise effect increases.

Consequently, according to the reflective photoelectric plethysmography sensor of the present invention satisfying Expression (1) described above, in comparison with the reflective photoelectric plethysmography sensors in the comparative examples, the effect of attenuating the light intensity decreases, the power consumption does not increase, and insusceptibility to noise effect is identified without reduction in signal intensity itself. Consequently, it is identified that the measurement accuracy is excellent.

INDUSTRIAL APPLICABILITY

The present invention can be used for a biological condition diagnosis system that diagnoses based on at least

REFERENCE SIGNS LIST

1 Biological condition diagnosis system
10 Biological data obtainer
11 Driver
12 Receiver
13 Preprocessor
14S Processor
14a First signal processor
14b Second signal processor
14c Frame data storage
15 Combiner
16 Display processor
17 Display
18 Measurement site setter
19 Received data storage
20 Diagnoser
30 Operation input receiver
40 Controller
40a CPU
40b RAM
40c ROM
14 Detector
41, 42 Light-transmissive substrate
43 Sealer
50 First electrode
60 Second electrode
70 Light receiving element
80 Light emitting element
h Shortest distance between light emitting element and light receiving element

The invention claimed is:

1. A biological condition diagnosis system, comprising, at least: a reflective photoelectric plethysmography sensor, an obtainer, a receiver, a preprocessor, a processor, and a diagnoser, for biological data,
wherein the obtainer obtains the biological data by the reflective photoelectric plethysmography sensor,
the preprocessor preprocesses the obtained biological data,
the processor extracts a feature point from the preprocessed data, and
the diagnoser diagnoses a biological condition using machine learning, based on the obtained biological data,
wherein the reflective photoelectric plethysmography sensor includes a light receiving element that is planar and a first light emitting element that is planar
provided that a shortest distance between the first light emitting element and the light receiving element is h (mm), a thickness of skin including the epidermis and dermis of a human body is t (mm), and the thickness is within a range from 0.1 to 4 mm,", the shortest distance h (mm) between the first light emitting element and the light receiving element satisfies the following Expression (1), $$(t \times 0.7)^2 \leq h \leq (t \times 1.3)^2, \text{ and} \quad \text{Expression (1):}$$

the reflective photoelectric plethysmography sensor includes a second light emitting element that does not satisfy the shortest distance, wherein the biological data obtained based on light emitted from the second light emitting element contains noise, and valid vital data is obtained by subtracting the vital data containing the noise from vital data obtained based on light emitted from the first light emitting element.

2. The biological condition diagnosis system according to claim 1, wherein the first light emitting element of the reflective photoelectric plethysmography sensor is used as a planar light source for light with which biological tissue is illuminated.

3. The biological condition diagnosis system according to claim 1, wherein the first light emitting element of the reflective photoelectric plethysmography sensor is an organic EL element.

4. The biological condition diagnosis system according to claim 1, wherein the light receiving element of the reflective photoelectric plethysmography sensor is an organic photodiode.

5. The biological condition diagnosis system according to claim 1, wherein the obtainer continuously measures and obtains the biological data.

6. The biological condition diagnosis system according to claim 1, wherein the obtainer simultaneously measures and obtains two or more types of the biological data.

7. The biological condition diagnosis system according to claim 1, wherein the obtainer simultaneously measures and obtains the biological data on biological sites at two or more positions.

8. The biological condition diagnosis system according to claim 1, further comprising a combiner that combines the obtained biological data and generates an integrated data item.

9. The biological condition diagnosis system according to claim 1, wherein the diagnoser uses a learning model obtained by machine learning where the biological data in accordance with an attribute is adopted as an explanatory variable, and a corresponding biological condition in accordance with the attribute is adopted as an objective variable.

10. The biological condition diagnosis system according to claim 1, wherein the diagnoser uses a learning model using deep learning, based on the obtained biological data.

11. The biological condition diagnosis system according to claim 1, wherein the shortest distance between the first light emitting element and the light receiving element is within a range from 2 to 25 mm.

12. The biological condition diagnosis system according to claim 1, wherein each of the first light emitting element and the second light emitting element is disposed on a substantially concentric circle centered on a center point of the light receiving element.

13. The biological condition diagnosis system according to claim 1, wherein the reflective photoelectric plethysmography sensor further includes a plurality of extraction electrodes, the first light emitting element is not continuous, and at least one extraction electrode of the plurality of electrodes that is connected to the light receiving element extends through a space between two sections of the first light emitting element on a concentric circle.

* * * * *